US012495109B1

United States Patent
Allen et al.

(10) Patent No.: US 12,495,109 B1
(45) Date of Patent: Dec. 9, 2025

(54) AUTOMATED PANIC BUTTON RESPONSE SYSTEM WITH LOCATION-BASED VIDEO FEEDS AND TELEPHONIC CONNECTIONS

(71) Applicant: 911Inform LLC, Wall Township, NJ (US)

(72) Inventors: Ivo W. Allen, Freehold, NJ (US); Michael J. Clark, Marlton, NJ (US)

(73) Assignee: 911Inform LLC, Wall Township, NJ (US)

( * ) Notice: Subject to any disclaimer, the term of this patent is extended or adjusted under 35 U.S.C. 154(b) by 0 days.

(21) Appl. No.: 18/999,702

(22) Filed: Dec. 23, 2024

(51) Int. Cl.
| | |
|---|---|
| *H04M 1/72424* | (2021.01) |
| *H04L 65/1069* | (2022.01) |
| *H04L 65/1089* | (2022.01) |
| *H04M 3/42* | (2006.01) |
| *H04M 11/04* | (2006.01) |
| *H04N 7/18* | (2006.01) |

(52) U.S. Cl.
CPC .... *H04M 1/72424* (2021.01); *H04L 65/1069* (2013.01); *H04L 65/1089* (2013.01); *H04M 3/42357* (2013.01); *H04M 11/04* (2013.01); *H04N 7/181* (2013.01)

(58) Field of Classification Search
None
See application file for complete search history.

(56) References Cited

U.S. PATENT DOCUMENTS

| | | | |
|---|---|---|---|
| 8,249,547 B1* | 8/2012 | Fellner | G08B 25/016 455/556.1 |
| 9,892,625 B2* | 2/2018 | Kim | G08B 25/016 |
| 10,037,668 B1* | 7/2018 | DesGarennes | G08B 21/0415 |
| 10,629,062 B2 | 4/2020 | Billig et al. | |
| 10,854,058 B2 | 12/2020 | Davies et al. | |
| 11,183,044 B1* | 11/2021 | Klein | G08B 25/016 |
| 11,189,160 B1* | 11/2021 | Natauri | G08B 21/043 |
| 11,527,149 B2* | 12/2022 | Davies | G08B 25/10 |
| 11,557,197 B2 | 1/2023 | Delgado et al. | |
| 11,581,099 B1* | 2/2023 | Rufo | G16H 20/13 |
| 11,587,555 B1* | 2/2023 | Pathak | G10L 25/51 |
| 11,810,447 B1* | 11/2023 | Riley | H04M 1/72412 |
| 2003/0027547 A1* | 2/2003 | Wade | G08B 25/016 455/404.1 |
| 2007/0206729 A1* | 9/2007 | Baum | H04M 11/04 379/37 |
| 2008/0064365 A1* | 3/2008 | Lang | H04M 11/04 455/414.1 |

(Continued)

*Primary Examiner* — Ricky Chin
(74) *Attorney, Agent, or Firm* — Morse, Barnes-Brown & Pendleton, P.C.; Sean D. Detweiler, Esq.

(57) ABSTRACT

A panic button response system includes a panic button installed at a facility and a service provider system with a database containing location data, video feeds, and active telephones for the facility. The service provider system's server, in communication with the panic button and the database, receives an activation signal from the panic button and automatically initiates a response process. This process involves identifying the panic button's location using the database, activating available video feeds at the identified location, and establishing a telephonic connection to a telephone at the identified location. The system enhances security and emergency response capabilities by swiftly and efficiently responding to panic button activations at the facility.

30 Claims, 7 Drawing Sheets

(56) References Cited

U.S. PATENT DOCUMENTS

| | | | |
|---|---|---|---|
| 2010/0124900 A1* | 5/2010 | Lui | H04W 76/50 |
| | | | 455/404.2 |
| 2010/0285771 A1* | 11/2010 | Peabody | G08B 25/001 |
| | | | 379/38 |
| 2011/0039514 A1* | 2/2011 | Patnaik | H04M 1/72424 |
| | | | 704/E15.001 |
| 2013/0260825 A1* | 10/2013 | Hagenstad | G08B 15/004 |
| | | | 455/556.1 |
| 2014/0057590 A1 | 2/2014 | Romero | |
| 2014/0266689 A1* | 9/2014 | McKinley | G08B 21/0446 |
| | | | 340/539.1 |
| 2015/0288797 A1* | 10/2015 | Vincent | G16H 10/60 |
| | | | 455/404.2 |
| 2017/0193306 A1* | 7/2017 | Robil | H04M 1/72457 |
| 2017/0365160 A1* | 12/2017 | Aurbach | G08B 25/10 |
| 2018/0130336 A1* | 5/2018 | Bangerter | G08B 25/016 |
| 2018/0174430 A1* | 6/2018 | Sieja | G08B 21/0453 |
| 2018/0176362 A1* | 6/2018 | Cohen | H04M 3/53375 |
| 2018/0199546 A1* | 7/2018 | Temel | H04W 76/50 |
| 2018/0332162 A1* | 11/2018 | Schutter | H04W 12/61 |
| 2018/0342329 A1* | 11/2018 | Rufo | G16H 40/67 |
| 2018/0357887 A1* | 12/2018 | Geyer | G08B 21/0469 |
| 2020/0099896 A1* | 3/2020 | Galvin | G01D 3/022 |
| 2020/0135005 A1* | 4/2020 | Katz | H04M 7/0021 |
| 2020/0259944 A1* | 8/2020 | Hoggeg | H04W 4/12 |
| 2020/0329085 A1* | 10/2020 | Lin | H04L 65/1069 |
| 2021/0027591 A1* | 1/2021 | Davies | G06Q 30/0601 |
| 2021/0217293 A1* | 7/2021 | Harris | H04N 7/188 |
| 2022/0270461 A1* | 8/2022 | Watts | G06F 18/2431 |
| 2023/0018815 A1* | 1/2023 | Mani | H04N 21/488 |
| 2023/0199461 A1* | 6/2023 | Allen | H04W 4/021 |
| | | | 455/404.2 |
| 2023/0199462 A1* | 6/2023 | Allen | H04W 4/029 |
| | | | 455/404.2 |

* cited by examiner

AUTOMATED PANIC BUTTON RESPONSE SYSTEM WITH LOCATION-BASED VIDEO FEEDS AND TELEPHONIC CONNECTIONS

FIELD OF THE INVENTION

The present invention relates to panic button systems. In particular, the present invention relates to an automated panic button response system with location-based video feeds and telephonic connections.

BACKGROUND

Existing panic button systems typically involve a manual activation process where an individual must physically press a panic button to trigger a response. Upon activation, these systems may notify security personnel or emergency services, but they often cannot provide real-time information about the location of the incident. In some cases, security cameras may be installed at the facility, but accessing and activating these video feeds in response to a panic button activation is typically a manual and time-consuming process. Additionally, establishing a telephonic connection to a specific telephone at the location of the panic button may require additional steps and coordination, leading to potential delays in response times.

In traditional panic button systems, the response process relies heavily on human intervention and decision-making, which can introduce delays and errors in responding to emergencies. Security personnel or emergency responders may need to locate the source of the panic button activation manually, access relevant video feeds, and establish telephonic connections, all of which can consume valuable time during critical situations. Furthermore, the lack of integration between panic buttons, location data, video feeds, and telephonic systems can result in disjointed and inefficient emergency response procedures.

Efforts have been made to enhance panic button systems by incorporating elements of automation and integration to streamline the response process. Some systems have integrated location databases to automatically identify the source of a panic button activation and provide real-time information to responders. However, these systems may still require manual intervention to access video feeds and establish telephonic connections, limiting the overall efficiency of the response process. Additionally, the coordination between different system components may not be seamless, leading to potential gaps in communication and response coordination.

SUMMARY

There is a need for an automated panic button response system capable of swiftly and efficiently responding to panic button activations at a facility with location-based video feeds and telephonic connections. The present invention is directed toward further solutions to address this need, in addition to having other desirable characteristics.

In accordance with embodiments of the present invention, a panic button response system is provided. The system includes one or more one or more panic buttons deployed at a site and a service provider system having a database of location data, including available video feeds and active telephones for the site and a server in communication with the database and the one or more panic buttons. The server of the service provider system receives an activation signal from one of the one or more panic buttons, and in response to receiving the activation signal, automatically implements a response process. The response process includes identifying the location of the panic button from which the activation signal was received using the location database, activating available video feeds at the identified location of the panic button from which the activation signal was received, and establishing a telephonic connection to a telephone at the identified location of the panic button from which the activation signal was received.

In accordance with aspects of the present invention, the one or more panic buttons are a button provided on a telephone. In other aspects, the one or more panic buttons are a wearable pendant. In further aspects, the one or more panic buttons are a virtual button in a mobile application installed on a mobile device. In still further aspects, the one or more panic buttons are a device at a fixed location.

In accordance with aspects of the present invention, the service provider system response process further includes the server providing authorities with one or more of access to activated available video feeds at the identified location of the panic button from which the activation signal was received and access to the established telephonic connection at the identified location of the panic button from which the activation signal was received.

In accordance with aspects of the present invention, identifying the location of the panic button from which the activation signal was received involves identifying a location of a telephone on which the panic button is provided using the location database. In other aspects, identifying the location of the panic button from which the activation signal was received involves identifying the location of a pendant on which the panic button is provided. In further aspects, identifying the location of the panic button from which the activation signal was received involves identifying a specified location of a mobile device on which the panic button is provided. In still further aspects, identifying the location of the panic button from which the activation signal was received involves identifying a fixed location of a device on which the panic button is provided.

In accordance with aspects of the present invention, the activation signal is received via an internet protocol.

In accordance with aspects of the present invention, establishing a telephonic connection to a telephone at the identified location of the panic button from which the activation signal was received involves activating intercom functionality of the telephone.

In accordance with aspects of the present invention, the available video feeds at the identified location of the panic button from which the activation signal was received are provided with one or more internet protocol (IP) cameras.

In accordance with aspects of the present invention, the activation signal comprises an API call to the service provider system.

In accordance with aspects of the present invention, the activation signal comprises a unique identifier.

In accordance with embodiments of the present invention, a method for responding to a panic button activation is provided. The method involves providing one or more panic buttons deployed at a site; providing a service provider system including a database of location data including available video feeds and active telephones for the site and a server in communication with the database and one or more panic buttons; receiving, by the server of the service provider system, an activation signal from one of the one or more panic buttons; and in response to receiving the activation signal, automatically implementing, by the server of the service provider system. The response process involves identifying the location of the panic button from which the activation signal was received using the location database, activating available video feeds at the identified location of the panic button from which the activation signal was received, and establishing a telephonic connection to a telephone at the identified location of the panic button from which the activation signal was received.

In accordance with aspects of the present invention, the one or more panic buttons are a button provided on a telephone. In other aspects, the one or more panic buttons are a wearable pendant. In further aspects, the one or more panic buttons are a virtual button in a mobile application installed on a mobile device. In still further aspects, the one or more panic buttons are a device at a fixed location.

In accordance with aspects of the present invention, the service provider system response process further includes the server providing authorities with one or more of access to activated available video feeds at the identified location of the panic button from which the activation signal was received and access to the established telephonic connection at the identified location of the panic button from which the activation signal was received.

In accordance with aspects of the present invention, identifying the location of the panic button from which the activation signal was received involves identifying a location of a telephone on which the panic button is provided using the location database. In other aspects, identifying the location of the panic button from which the activation signal was received involves identifying the location of a pendant on which the panic button is provided. In further aspects, identifying the location of the panic button from which the activation signal was received involves identifying a specified location of a mobile device on which the panic button is provided. In still further aspects, identifying the location of the panic button from which the activation signal was received involves identifying a fixed location of a device on which the panic button is provided.

In accordance with aspects of the present invention, the activation signal is received via an internet protocol.

In accordance with aspects of the present invention, establishing a telephonic connection to a telephone at the identified location of the panic button from which the activation signal was received involves activating intercom functionality of the telephone.

In accordance with aspects of the present invention, the available video feeds at the identified location of the panic button from which the activation signal was received are provided with one or more internet protocol (IP) cameras.

In accordance with aspects of the present invention, the activation signal comprises an API call to the service provider system.

In accordance with aspects of the present invention, the activation signal comprises a unique identifier.

BRIEF DESCRIPTION OF THE FIGURES

These and other characteristics of the present invention will be more fully understood by reference to the following detailed description in conjunction with the attached drawings in which.

DETAILED DESCRIPTION

An illustrative embodiment of the present invention relates to a panic button response system comprising a panic button installed at a facility and a service provider system with a database containing location data, video feeds, and active telephones for the facility to enable real-time communicative interaction inside the facility. The service provider system's server, in communication with the panic button and the database, receives an activation signal from the panic button and automatically initiates a response process. This process involves identifying the panic button's location using the database, activating available video feeds at the identified location, and establishing a telephonic connection to a telephone at the identified location.

FIG. 1 through FIG. 8, wherein like parts are designated by like reference numerals throughout, illustrate an example embodiment or embodiments of a system and method for an automated panic button response system with location-based video feeds and telephonic connections according to the present invention. Although the present invention will be described with reference to the example embodiment or embodiments illustrated in the figures, it should be understood that many alternative forms can embody the present invention. One of skill in the art will additionally appreciate different ways to alter the parameters of the embodiment(s) disclosed, such as the size, shape, or type of elements or materials, in a manner still in keeping with the spirit and scope of the present invention.

Figure 1:
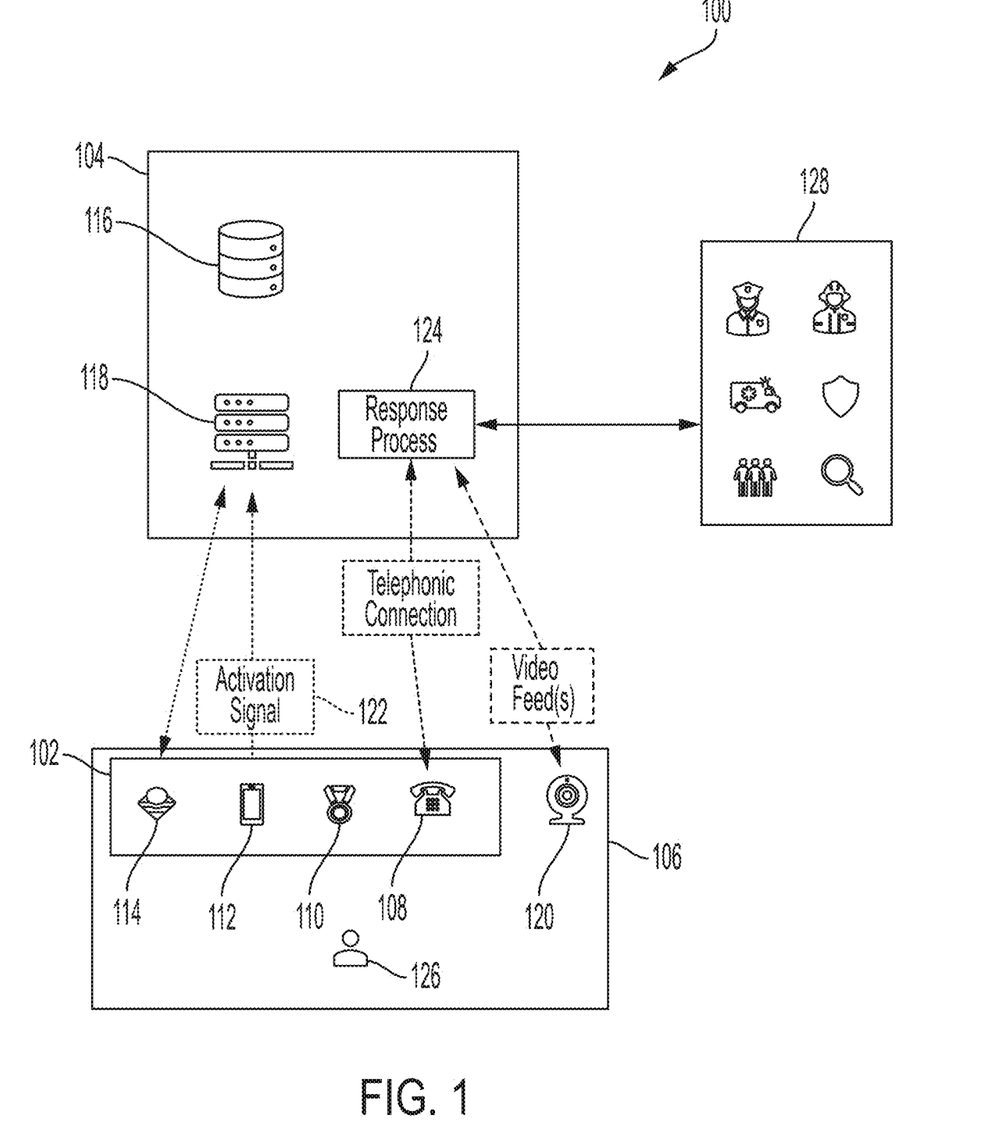
FIG. 1 is a diagrammatic illustration of an example system for providing panic button response in accordance with embodiments of the present invention.

FIG. 1 depicts an example system 100 for implementing the present invention. The system 100 comprises one or more panic buttons 102 and a service provider system 104.

The one or more panic buttons 102 are deployed at a site 106 of a client of the service provider 104. The site 106 may be a location, facility, venue, campus, or other building, etc., and includes equivalents that would be appreciated by those of skill in the art. The one or more panic buttons 102 can comprise or otherwise be implemented as one or more of a button provided on a telephone 108 at the site 106, a wearable pendant 110, a virtual button in a mobile application installed on a mobile device 112, and a device 114, such as a physical panic button, at a fixed location. Other possible implementations for the one or more panic buttons 102 will be apparent to one skilled in the art, given the benefit of this disclosure.

The service provider system 104 is the hardware and software deployed at a service provider that provides the functionality of the present system 100. The service provider may be remote or cloud-based. In other embodiments, the service provider system 104 can be located at the site 106. Here, the service provider system 104 comprises a database 116 and server 118.

The database 116 contains location data for the site 106, including available video feeds 120 and active telephones 108 at the site 106. In certain embodiments, this location data can include one more maps of the site 106 with indications of the available or active telephones 108 and video feeds 120. In some embodiments, the one or more panic buttons 102 include a device 114, such as a physical panic button, at a fixed location, the fixed location of the device 114 may also be indicated on the one or more maps. Other possible implementations will be apparent to one skilled in the art, given the benefit of this disclosure.

The server 118 is in communication with the database 116 and the one or more panic buttons 102. The communication between the server 118 and the database 116 is an electrical communication such as a network connection using wired or wireless protocols. The communication between the server 118 and one or more panic buttons 102 may depend on the implementation of the one or more panic buttons 102. For example, if a panic button 102 is a button provided on a telephone 108 at the site 106, the communication between on the server 118 and panic button 102 may use a telephone protocol, such as a voice over internet protocol (VOIP). If the panic button is implemented as a wearable pendant 110, the communication may be wireless communication between the pendant 110 and the server 118 or wireless communication (including infrared and RF) between the pendant 110 and a receiver located at the site 106, which in turn may be in communication with the server 118 over a network connection (wired or wireless) or dedicated (wired or wireless) connection. If a panic button 102 is implemented as a virtual button in a mobile application installed on a mobile device 112, the mobile device 112 can communicate with server 118 using the communication protocols provided by the mobile device 112 (including but not limited to cellular, Wi-Fi, Bluetooth, and RF). If the panic button 102 is implemented as a device 114, such as a physical panic button at a fixed location at the site 106, the device 114 may be provided with a wired or wireless connection to the server 118. It should be understood that these are mere examples of possible connectivity. Other configurations and connectivity will be apparent to one skilled in the art, given the benefit of this disclosure, and are considered to be equivalent.

The server 118 is configured to receive an activation signal 122 from one of the one or more panic buttons 102 and in response to receiving the activation signal 122, automatically implement a response process 124.

The system 100 further includes a user 126 and authorities 128. The user 126 is the entity that activates a panic button 102. The authorities 128 can include the police, fire department, emergency responders, federal agencies, security agencies, investigative agencies, or the like.

Figure 2:
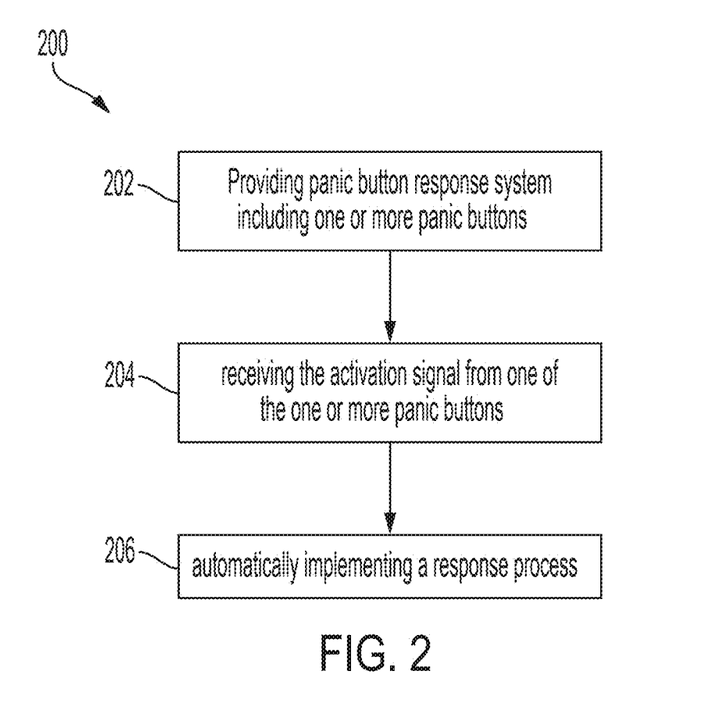
FIG. 2 is a flowchart depicting an example method for providing a panic button response in accordance with embodiments of the present invention.

FIG. 2 is a flowchart 200 depicting a method responding to a panic button activation involving the components of FIG. 1. The method begins with providing a panic button response system 100 including one or more panic buttons 102 the site 106 in communication with the service provider system 104 (Step 202). When the user 126 activates one of the one or more panic buttons 102, an activation signal 122 is generated. The activation signal 122 can then be received by the server 118 of the service provider system 104 (Step 204). In response to receiving the activation signal 122, the server 118 automatically implements the response process 124 (Step 206).

The activation signal 122 may be received in different formats based on the configuration or implementation of the respective panic button 102 providing the activation signal 122. In some embodiments, the activation signal 122 is received via an internet protocol. In other embodiments, the activation signal 122 is received via an API call to the service provider system 104. In still other embodiments, the activation signal 122 may be a serial communication provided via a dedicated connection. In certain embodiments, the activation signal 122 includes a unique identifier to identify the particular panic button 102. In still other embodiments, the activation signal 122 may further include location data for the panic button 102. It should be understood that these are mere examples of possible connectivity. Other configurations and connectivity will be apparent to one skilled in the art, given the benefit of this disclosure, and are considered to be equivalent.

Figure 3:
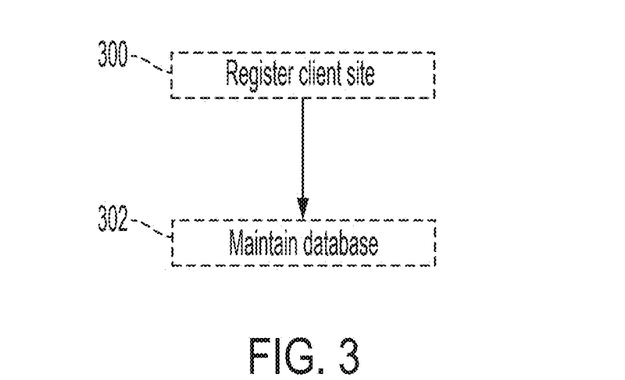
FIG. 3 is a flowchart depicting an example of additional steps that may be performed in support of providing a panic button response in accordance with embodiments of the present invention.

FIG. 3 depicts some additional steps that may be performed by the server 118 of the service provider system 104 in support of the panic button functionality. The first additional step is registering the client site (Step 300). In this step, the information about the client and their particular sites 106 including the number of active telephones 108, the telephone numbers associated with the active telephones 108, details about the one or more panic buttons 102, the available video feeds 120, how to access the available video feeds, as well as protocols and permissions for the client and the site 106 including the authorities 128 that may be notified in response to an activation signal 122. The next additional step is maintaining the database 116 containing location data for the active telephones 108 and active video feeds of the site 106 (Step 302). In embodiments where the one or more panic buttons 102 include a device 114 at a fixed location, the location of the device(s) 114 can also be included. The geospatial location data can include one or more of a country indication, a state indication, a street address, a floor designation, a room designation, and a floorplan indication. An example of such a floorplan showing the information about the active telephones 108, available video feeds 120, and devices 114, such as physical panic buttons, deployed at a site 106 can be seen in FIG. 4.

Figure 4:
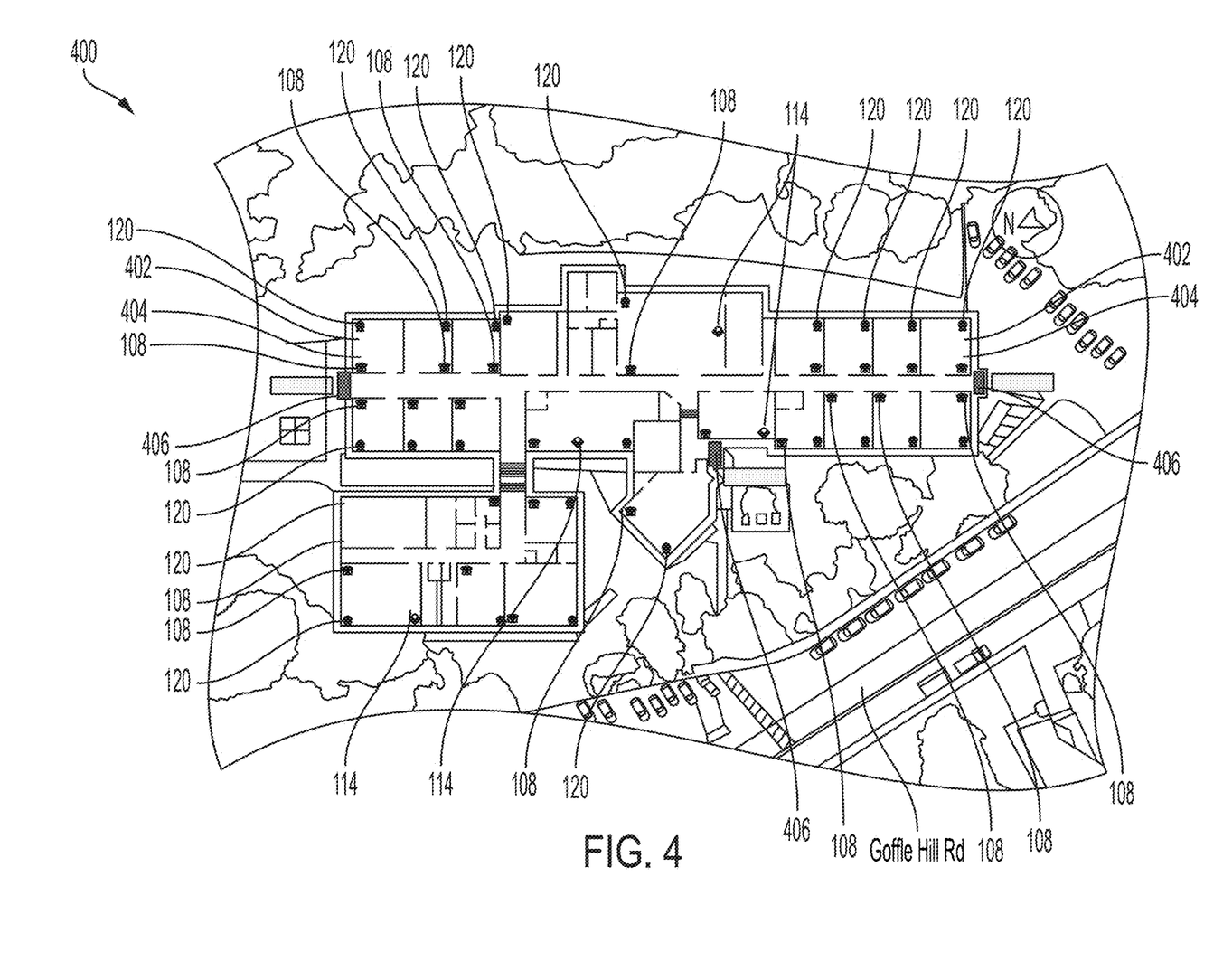
FIG. 4 is a diagrammatic illustration of an example floorplan showing the location of active telephones and available video feeds.

FIG. 4 is an example floorplan 400 indicating the locations of active telephones 108, available video feeds 120, and devices 114, such as physical panic buttons, at fixed locations. The floorplan 400 also includes room numbers 402, extensions 404 for the active telephones, and entrances/exits 406.

Figure 5:
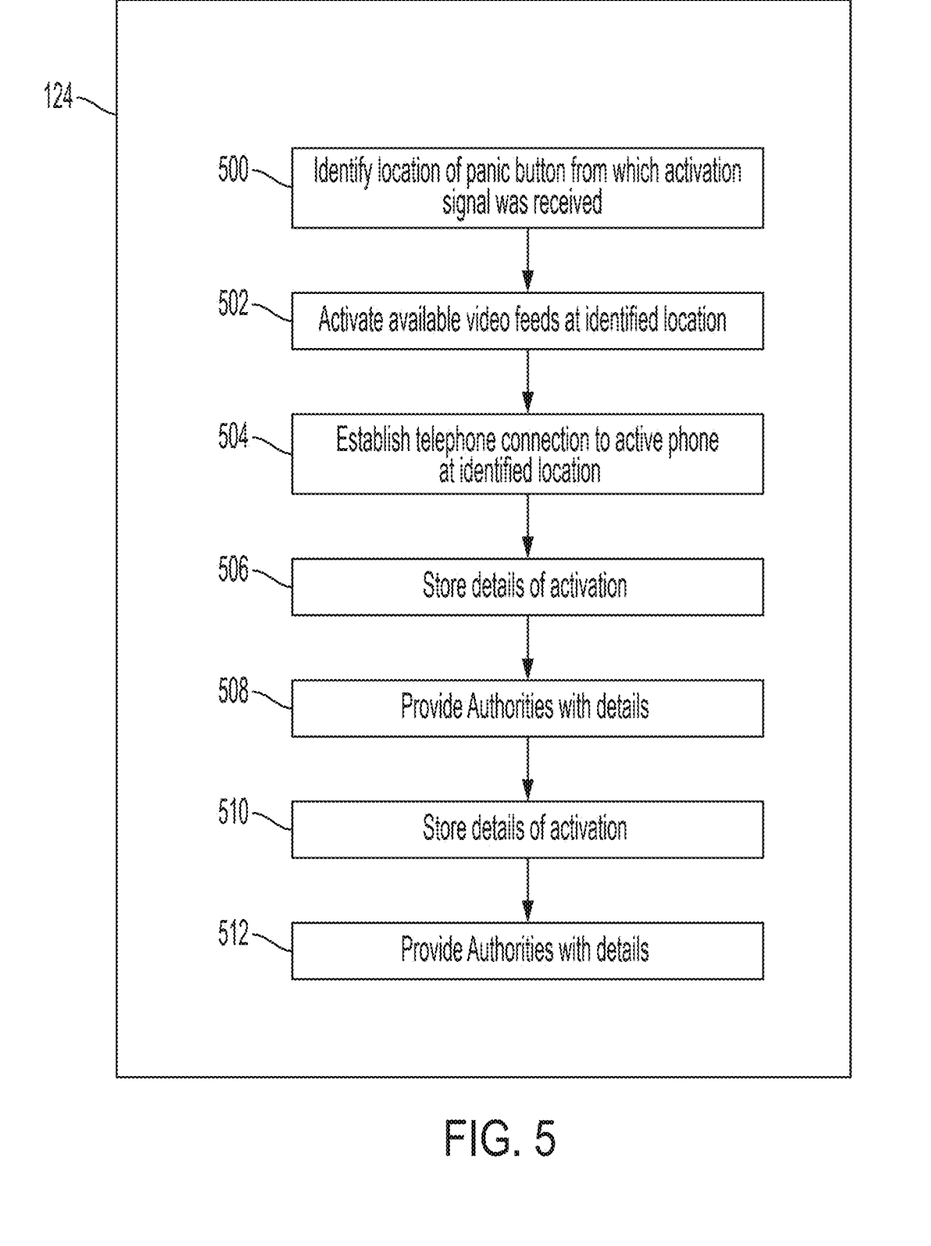
FIG. 5 is a flowchart depicting the steps involved in the response process in accordance with embodiments of the present invention.

FIG. 5 depicts the steps involved with the response process 124 that is automatically implemented (Step 206). The first step is identifying the location of the panic button 102 from which the activation signal 122 was received using the location database 116 (Step 500). Available video feeds 120 at the identified location of the panic button 102 from which the activation signal 122 was received can then be activated (Step 502). A telephone connection to a telephone at the identified location of the panic button from which the activation signal was received is also established (Step 504).

The method or approach for identifying the location of the panic button 102 from which the activation signal 122 was received (Step 500) depends on the implementation of the panic button 102.

In embodiments where the panic button 102 is implemented as a button on a telephone 108, identifying the location of the panic button 102 comprises identifying the telephone 108 on which the panic button 102 is provided and from which the activation signal 122 was received. For example, the activation signal 122 could be transmitted using the telephony system protocol used to provide the telephone functionality, which would identify the telephone 108 being used. The location of the identified telephone 108 could then be determined using the location database 116.

In embodiments where the panic button 102 is implemented as a pendant 110, identifying the location of the panic button 102 from which the activation signal 122 was received comprises identifying the location of the pendant 110 on which the panic button 102 is provided. In some such embodiments, the pendant 110 may provide its location (such as GPS coordinates) along with or as part of the activation signal 122. In other embodiments, the activation signal 122 or another signal from the pendant 110 may be received by a receiver at a fixed, known location (which is included in the database 116). The receiver then forwards the activation signal 122 or generates the activation signal 122 in response to a received signal from the pendant 110. The receiver can be identified by a unique identifier provided along with or as part of the activation signal 122. Once the receiver is identified, its location can be determined using the database 116.

In embodiments where the panic button 102 is implemented as a virtual button in a mobile application installed on a mobile device 112, identifying the location of the panic button 102 from which the activation signal 122 was received comprises identifying the location of the mobile device 112 on which the panic button 102 is provided. In certain embodiments, the mobile device 112 may provide or specify its location (such as GPS coordinates) along with or as part of the activation signal 122. In other embodiments, the location of the device 112 can be triangulated or otherwise identified based on the fixed, known locations of Wi-Fi receivers or cellular towers that receive transmissions from the mobile device 112.

In embodiments where the panic button 102 is implemented as a device 114, such as a physical panic button, at a fixed location, identifying the location of the panic button 102 comprises identifying the device 114 from which the activation signal 122 was received. The device 114 can be identified by a unique identifier provided along with or as part of the activation signal 122. Once the device 114 is identified, its location can be determined using the database 116.

It should be understood that the above examples are just some of the possible ways the location of the panic button 102 from which the activation signal 122 is received can be identified. Other possible implementations, configurations, approaches, and techniques for identifying the location of the panic button 102 will be apparent to one skilled in the art, given the benefit of this disclosure.

In certain embodiments, once the location of the panic button 102 from which the activation signal 122 is received has been identified, the identified location 602 can be indicated on a provided floorplan 600. An example of this can be seen in FIG. 6. Here, the identified location 602 of the panic button 102 from which the activation signal 122 was received has been identified and indicated on the floorplan 600 by highlighting or otherwise providing an indication of the identified room. In this example, room 302 has been indicated as the identified location 602 of the panic button 102 from which the activation signal 122 has been received. Here, it can also be seen that room 302 also has an available video feed 120 and an active telephone (extension 302).

The step of activating available video feeds 120 at the identified location of the panic button 102 from which the activation signal 122 is received (step 502) involves consulting the database 116 and identifying available feeds 120 in the same location as the identified location of the panic button 102 from which the activation signal 122 was received and then activating them. For example, in the case of FIG. 6, the identified location 602 on the provided floorplan 600 indicates that the room (Room 302) where the activated panic button 102 is located also has an available video feed 120.

Figure 6:
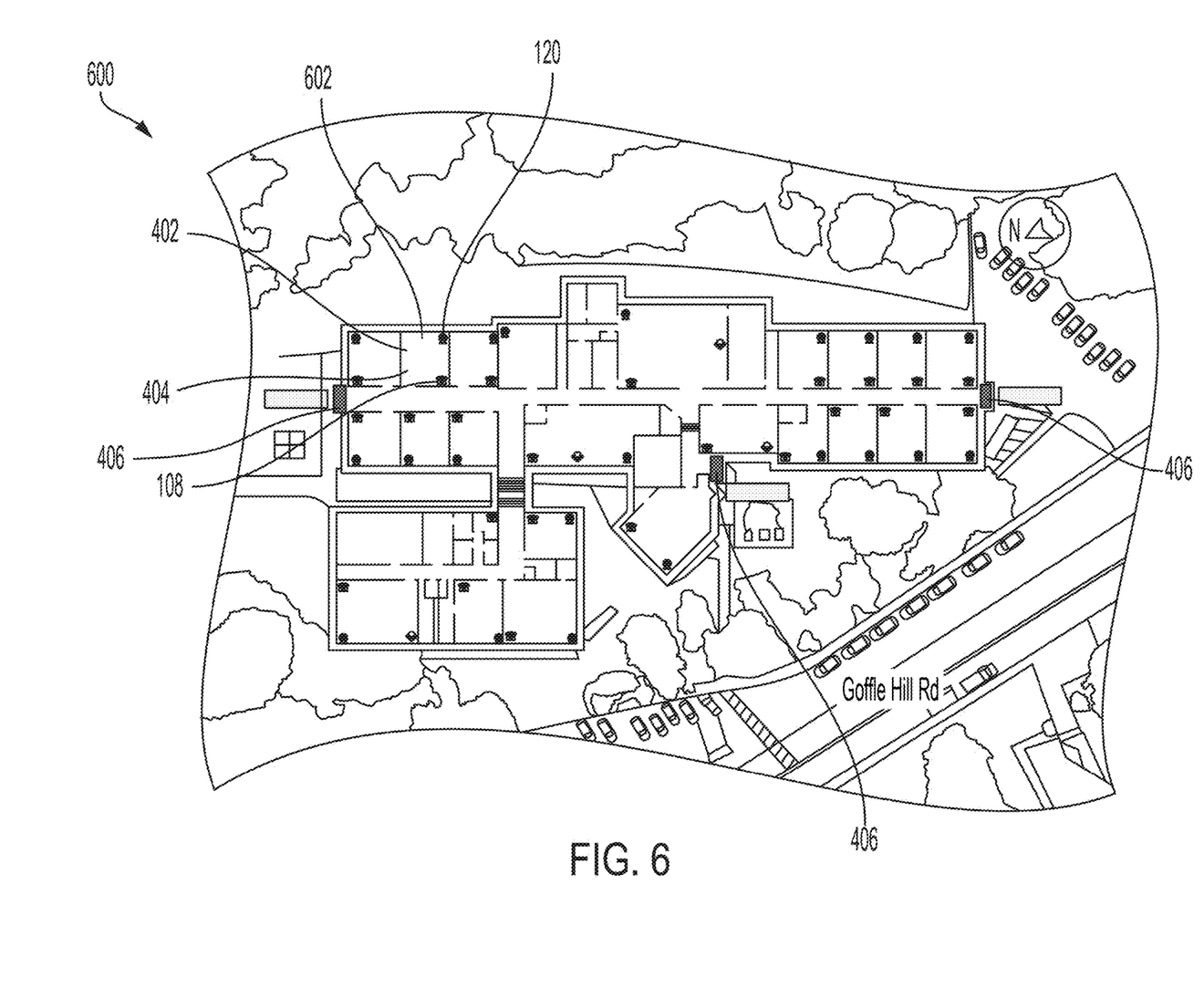
FIG. 6 is a diagrammatic illustration of an example floorplan showing the location of the panic button from which an activation signal was received and the active telephones and available video feeds at the location.

The method for activating the available video feeds 120 may also be included in the database 116. In certain embodiments, the available video feeds 120 at the identified location of the panic button 102 from which the activation signal 122 was received are provided with one or more internet protocol (IP) cameras. In such instances, activating the video feeds 120 involves accessing the IP address of the camera(s) and turning on or otherwise accessing the video provided by the IP camera(s) as provided for in the database 116. In some embodiments where a floorplan 600 is provided, activating the available video feeds 120 may be performed by selecting the icon representing the video feeds on the floorplan 600. Other possible ways of implementing and activating the available video feeds 120 will be apparent to one skilled in the art given the benefit of this disclosure.

Figure 7:
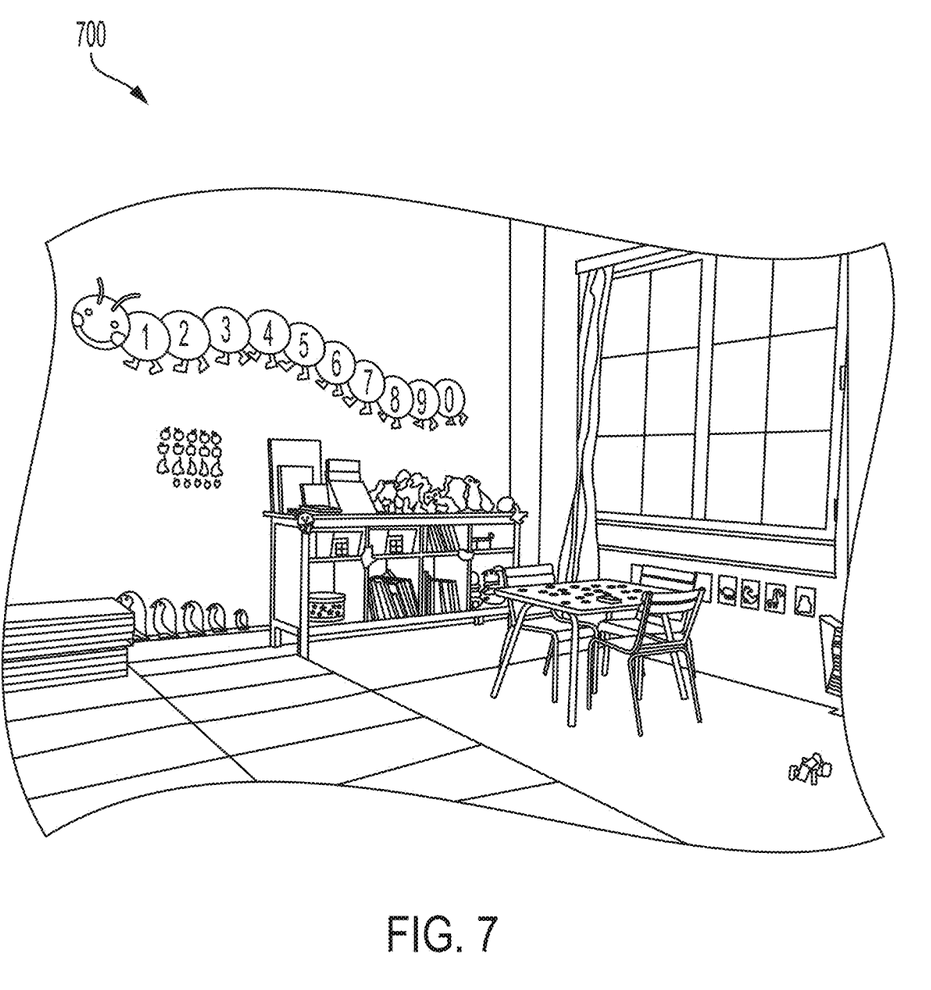
FIG. 7 depicts an example video feed.

An example of an activated video feed 700 can be seen in FIG. 7. Here, the activated video feed 700 is of a classroom.

The step of establishing a telephone connection to a telephone 108 at the identified location of the panic button 102 from which the activation signal 122 is received (step 504) involves consulting the database 116 and identifying active telephones 108 in the same location as the identified location of the panic button 102 from which the activation signal 122 was received and then establishing a connection to them. For example, in the case of FIG. 6, the identified location 602 on the provided floorplan 600 indicates that the room (Room 302), the activated panic button 102 is located also has an active telephone (extension 302).

The method for establishing the telephone connection may also be included in the database 116. Typically, this involves calling the telephone 108 at the identified location of the panic button 102 from which the activation signal 122 is received. In some embodiments where a floorplan 600 is provided, establishing the telephone connection may be performed by selecting the icon representing the telephone on the floorplan 600. In certain embodiments, establishing a telephonic connection to a telephone 108 at the identified location of the panic button 102 from which the activation signal 122 was received comprises activating intercom functionality of the telephone 108. For example, some telephones allow for the intercom functionality to be activated upon receipt of a call based on a number dialed or protocol implemented. Other possible ways of implementing and establishing a telephone connection will be apparent to one skilled in the art, given the benefit of this disclosure.

In some embodiments, one or more additional steps may be performed by the server as part of the response process 124. One such step is storing the details of the panic button activation (Step 506). This may involve storing one or more of the particular panic buttons 102 activated, the time of the activation, the location of the activation, the video feeds 120 activated, and the extension of the telephone connection established. Once stored, the details can be accessed as needed. Another possible step is providing the authorities 128 with the details of the activation (Step 508). This may involve providing the authorities 128 with access to the available video feeds 120 at the identified location of the panic button 102 from which the activation signal 122 was received (Step 510) and/or access to the established telephonic connection at the identified location of the panic button 102 from which the activation signal 122 was received (Step 512). In certain embodiments, this may involve providing the authorities 128 with a floorplan 600, such as shown in FIG. 6. In some such embodiments, the authorities 128 can access the video feeds 120 or telephone connection by selecting the icon(s) representing the video feeds or telephone 108 on the floorplan 600.

Figure 8:
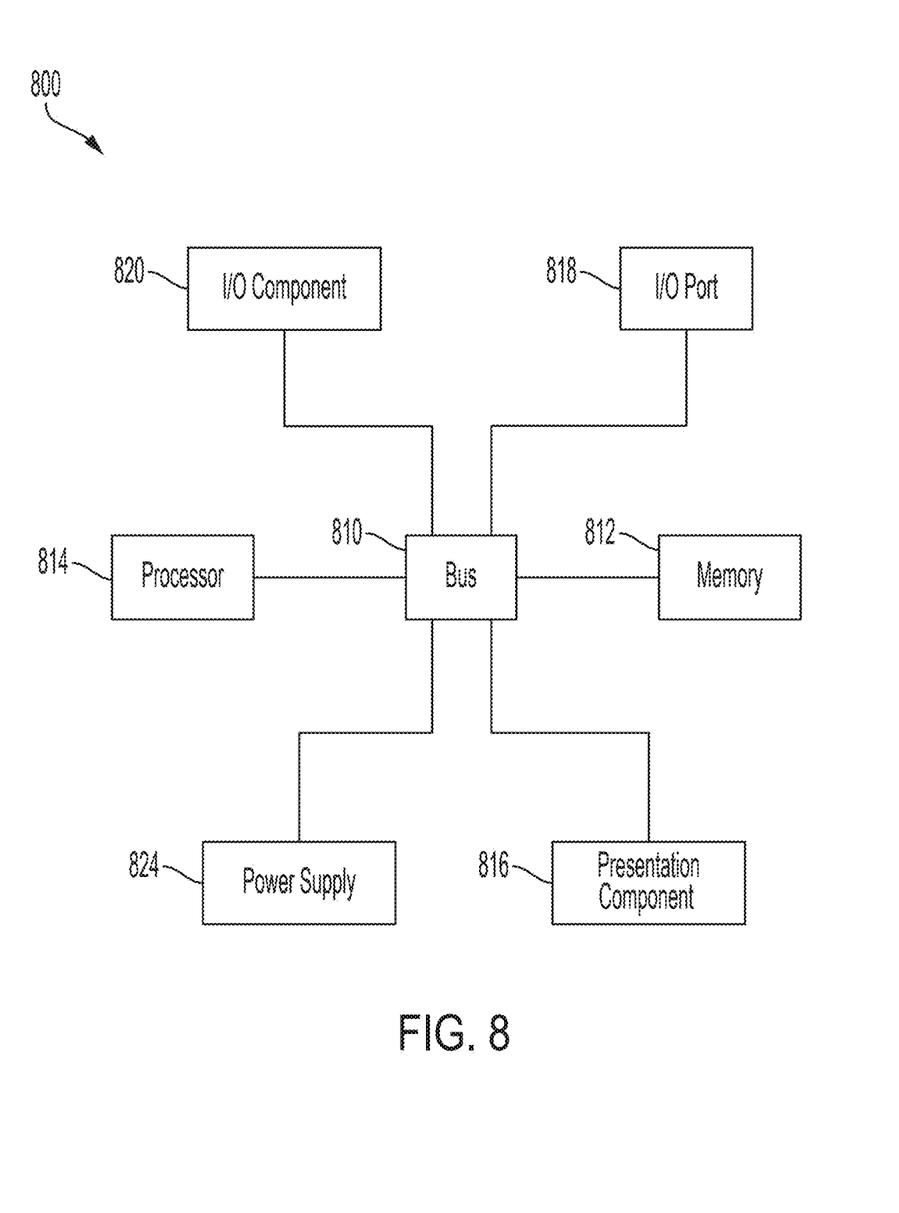
FIG. 8 is a diagrammatic illustration of a high-level architecture configured for implementing processes in accordance with aspects of the invention.

One illustrative example of a computing device 800 used to provide the functionality of the present invention, such as provided by the panic button 102, service provider system 104, client site 106, or authorities 128. The computing device 800 is merely an illustrative example of a suitable special-purpose computing environment and in no way limits the scope of the present invention. A "computing device," as represented by FIG. 8, can include a "workstation," a "server," a "laptop," a "desktop," a "hand-held device," a "mobile device," a "tablet computer," or other computing devices, as would be understood by those of skill in the art. Given that the computing device 800 is depicted for illustrative purposes, embodiments of the present invention may utilize any number of computing devices 800 in any number of different ways to implement a single embodiment of the present invention. Accordingly, embodiments of the present invention are not limited to a single computing device 800, as would be appreciated by one with skill in the art, nor are they limited to a single type of implementation or configuration of the example computing device 800.

The computing device 800 can include a bus 810 that can be coupled to one or more of the following illustrative components, directly or indirectly: a memory 812, one or more processors 814, one or more presentation components 816, input/output ports 818, input/output components 820, and a power supply 824. One of skill in the art will appreciate that the bus 810 can include one or more busses, such as an address bus, a data bus, or any combination thereof. One of skill in the art additionally will appreciate that, depending on the intended applications and uses of a particular embodiment, multiple of these components can be implemented by a single device. Similarly, in some instances, a single component can be implemented by multiple devices. As such, FIG. 8 is merely illustrative of an exemplary computing device that can be used to implement one or more embodiments of the present invention and in no way limits the invention.

The computing device 800 can include or interact with a variety of computer-readable media. For example, computer-readable media can include Random Access Memory (RAM), Read Only Memory (ROM), Electronically Erasable Programmable Read Only Memory (EEPROM), flash memory or other memory technologies, CDROM, digital versatile disks (DVD) or other optical or holographic media, magnetic cassettes, magnetic tape, magnetic disk storage or other magnetic storage devices that can be used to encode information and can be accessed by the computing device 800.

The memory 812 can include computer-storage media in the form of volatile and/or nonvolatile memory. The memory 812 may be removable, non-removable, or any combination thereof. Exemplary hardware devices are devices such as hard drives, solid-state memory, optical-disc drives, and the like. The computing device 800 can include one or more processors 814 that read data from components such as the memory 812, the various I/O components 816, etc. Presentation component(s) 816 present data indications to a user or other device. Exemplary presentation components include a display device, speaker, printing component, vibrating component, etc.

The I/O ports 818 can enable the computing device 800 to be logically coupled to other devices, such as I/O components 820. Some of the I/O components 820 can be built into the computing device 800. Examples of such I/O components 820 include a camera, microphone, joystick, recording device, game pad, satellite dish, scanner, printer, wireless device, networking device, and the like.

The power supply 824 can include batteries. Other suitable power supplies or batteries will be apparent to one skilled in the art, given the benefit of this disclosure.

The presented system enhances security and emergency response capabilities by swiftly and efficiently responding to panic button activations at the facility while automatically providing access to available video feeds and establishing telephone communication with a telephone at the location of the panic button activation.

As utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about", "generally", and "approximately" are intended to cover variations that may exist in the upper and lower limits of the ranges of subjective or objective values, such as variations in properties, parameters, sizes, and dimensions. In one non-limiting example, the terms "about", "generally", and "approximately" mean at, or plus 10 percent or less, or minus 10 percent or less. In one non-limiting example, the terms "about", "generally", and "approximately" mean sufficiently close to be deemed by one of skill in the art in the relevant field to be included. As utilized herein, the term "substantially" refers to the complete or nearly complete extent or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may, in some instances, depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one skilled in the art.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. Within this specification, embodiments have been described in a way that enables a clear and concise specification to be written, but it is intended and will be appreciated that embodiments may be variously combined or separated without parting from the invention. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

What is claimed is:

1. A panic button response system, the system comprising:
   one or more panic buttons deployed at a site of a client of a service provider and registered for the site with the service provider; and
   a service provider system, comprising:
      a database of location data for the site including fixed onsite locations of available video feeds and active telephone extensions registered for the site; and
      a server in communication with the database and the one or more panic buttons deployed at and registered for the site;
   wherein, the server of the service provider system receives an activation signal from one of the one or more panic buttons deployed at and registered for the site and in response to receiving the activation signal, automatically implements a response process;
   wherein the response process comprises:
      identifying the location at the site of the panic button deployed at and registered for the site from which the activation signal was received using the location database;
      activating available fixed onsite video feeds registered for the site in the location database at the identified location of the panic button from which the activation signal was received; and
      establishing a telephonic connection to a telephone on a fixed onsite active telephone extension registered for the site in the location database at the identified location of the panic button from which the activation signal was received.

2. The system of claim 1, wherein the one or more panic buttons comprise a button provided on a telephone on a fixed onsite active telephone extension registered in the location database.

3. The system of claim 1, wherein the one or more panic buttons registered for the site comprise a wearable pendant.

4. The system of claim 1, wherein the one or more panic buttons registered for the site comprise a virtual button in a mobile application installed on a mobile device.

5. The system of claim 1, wherein the one or more panic buttons registered for the site comprise a device deployed at a fixed onsite location registered in the location database.

6. The system of claim 1, wherein the service provider system response process further comprises:
   the server providing authorities with one or more of:
      access to activated available fixed onsite video feeds registered for the site in the location database at the identified location of the panic button from which the activation signal was received; and
      access to the established telephonic connection to the telephone on the fixed onsite active telephone extension registered for the site in the location database at the identified location of the panic button from which the activation signal was received.

7. The system of claim 1, wherein identifying the location at the site of the panic button registered for the site from which the activation signal was received comprises identifying a location of a telephone on a fixed onsite active telephone extension registered in the location database on which the panic button is provided using the location database.

8. The system of claim 1, wherein identifying the location at the site of the panic button from which the activation signal was received comprises identifying the location of a pendant registered for the site on which the panic button is provided.

9. The system of claim 1, wherein identifying the location at the site of the panic button registered from which the activation signal was received comprises identifying a specified location of a mobile device on which the panic button is provided.

10. The system of claim 1, wherein identifying the location at the site of the panic button from which the activation signal was received comprises identifying a deployed fixed onsite location of a device registered in the location database on which the panic button is provided.

11. The system of claim 1, wherein the activation signal is received via an internet protocol.

12. The system of claim 1, wherein establishing a telephonic connection to a telephone on a fixed onsite active telephone extension registered in the location database at the identified location of the panic button from which the activation signal was received comprises activating intercom functionality of the telephone.

13. The system of claim 1, wherein the available fixed onsite video feeds registered for the site in the location database at the identified location of the panic button from which the activation signal was received are provided with one or more internet protocol (IP) cameras.

14. The system of claim 1, wherein the activation signal comprises an API call to the service provider system.

15. The system of claim 1, wherein the activation signal comprises a unique identifier.

16. A method for responding to a panic button activation, the method comprising:
   providing one or more panic buttons deployed at a site of a client of a service provider and registered for the site with the service provider;
   providing a service provider system, comprising:
      a database of location data for the site including fixed onsite locations of available video feeds and active telephone extensions registered for the site; and
      a server in communication with the database and one or more panic buttons deployed at and registered for the site;
   receiving, by the server of the service provider system, an activation signal from one of the one or more panic buttons deployed at and registered for the site; and
   in response to receiving the activation signal, automatically implementing, by the server of the of the service provider system, a response process comprising:
      identifying the location at the site of the panic button deployed at and registered for the site from which the activation signal was received using the location database;
      activating available fixed onsite video feeds registered for the site in the location database at the identified location of the panic button from which the activation signal was received; and
      establishing a telephonic connection to a telephone on a fixed onsite active telephone extension registered for the site in the location database at the identified location of the panic button from which the activation signal was received.

17. The method of claim 16, wherein the one or more panic buttons comprise a button provided on a telephone on a fixed onsite active telephone extension registered in the location database.

18. The method of claim 16, wherein the one or more panic buttons registered for the site comprise a wearable pendant.

19. The method of claim 16, wherein the one or more panic buttons registered for the site comprise a virtual button in a mobile application installed on a mobile device.

20. The method of claim 16, wherein the one or more panic buttons registered for the site comprise a device deployed at a fixed onsite location registered in the location database.

21. The method of claim 16, wherein the service provider system response process further comprises:
the server providing authorities with one or more of:
access to activated available fixed onsite video feeds registered for the site in the location database at the identified location of the panic button from which the activation signal was received; and
access to the established telephonic connection to the telephone on the fixed onsite active telephone extension registered for the site in the location database at the identified location of the panic button from which the activation signal was received.

22. The method of claim 16, wherein identifying the location at the site of the panic button registered for the site from which the activation signal was received comprises identifying a location of a telephone on a fixed onsite active telephone extension registered in the location database on which the panic button is provided using the location database.

23. The method of claim 16, wherein identifying the location at the site of the panic button registered for the site from which the activation signal was received comprises identifying the location of a pendant on which the panic button is provided.

24. The method of claim 16, wherein identifying the location at the site of the panic button registered for the site from which the activation signal was received comprises identifying a specified location of a mobile device on which the panic button is provided.

25. The method of claim 16, wherein identifying the location of the panic button at the site from which the activation signal was received comprises identifying a deployed fixed onsite location of a device registered in the location database on which the panic button is provided.

26. The method of claim 16, wherein the activation signal is received via an internet protocol.

27. The method of claim 16, wherein establishing a telephonic connection to a telephone on a fixed onsite active telephone extension registered in the location database at the identified location of the panic button from which the activation signal was received comprises activating intercom functionality of the telephone.

28. The method of claim 16, wherein the available fixed onsite video feeds registered for the site in the location database at the identified location of the panic button from which the activation signal was received are provided with one or more internet protocol (IP) cameras.

29. The method of claim 16, wherein the activation signal comprises an API call to the service provider system.

30. The method of claim 16, wherein the activation signal comprises a unique identifier.

\* \* \* \* \*